(12) United States Patent
Sahm, III et al.

(10) Patent No.: US 7,959,844 B1
(45) Date of Patent: Jun. 14, 2011

(54) PLASTIC INJECTION MOLDING PROCESS

(75) Inventors: Victor A. Sahm, III, Dallas, TX (US); Charles Hansen, Irving, TX (US)

(73) Assignee: Maxi-Life, Inc., Addison, TX (US)

( * ) Notice: Subject to any disclaimer, the term of this patent is extended or adjusted under 35 U.S.C. 154(b) by 843 days.

(21) Appl. No.: 11/839,722

(22) Filed: Aug. 16, 2007

(51) Int. Cl.
  *B29C 45/46* (2006.01)
(52) U.S. Cl. .................................. 264/328.1
(58) Field of Classification Search ............. 264/328.1
  See application file for complete search history.

(56) References Cited

U.S. PATENT DOCUMENTS

| | | | |
|---|---|---|---|
| 5,589,128 A * | 12/1996 | Lai et al. | 264/328.1 |
| 6,746,560 B1 | 6/2004 | Humphrey et al. | |
| 2006/0165930 A1 * | 7/2006 | Easterday et al. | 264/537 |

FOREIGN PATENT DOCUMENTS

EP  1357136  * 10/2003

* cited by examiner

*Primary Examiner* — Jill L Heitbrink
(74) *Attorney, Agent, or Firm* — Gardere Wynne Sewell, LLP

(57) ABSTRACT

Plastic containers are injection molded of HDPE blow molding grade resin having a density of about 0.960 to 0.965 g/cc and a melt index of about 0.7 to 1.0 g/10 min. at injection temperatures of 570° F. to 670° F. and mold cavity pressures of 20,000 psig to 27,000 psig. Relatively thin walled, rigid, livestock feed containers can be manufactured using about 20% to 50% less material while retaining strength and durability comparable to containers molded of HDPE injection molding grade resins.

10 Claims, 1 Drawing Sheet

PLASTIC INJECTION MOLDING PROCESS

BACKGROUND OF THE INVENTION

In the art of manufacturing molded plastic containers and the like, blow molding processes and injection molding processes have become highly developed. Relatively thin walled containers of high density polyethylene (HDPE) polymer material can be easily blow molded using blow molding equipment. For example, HDPE polymers for blow molding consumer milk containers have a density of approximately 0.960 to 0.965 g/cc. Conversely, relatively low to medium density polyethylene polymers (0.900 to 0.960 g/cc) are used in thicker walled, non-rigid containers such as large trashcans. Moreover, HDPE blow molding resins typically have a melt index of about 0.7 to 1.0 grams/10 min., whereas injection molding polymers have a melt index of about 6.0 or more grams/10 min.

In manufacturing containers for agricultural applications such as livestock feed tubs and the like, it is desirable to provide a rigid, durable container which is economical to produce and uses a minimum amount of polymer material. Those manufacturers equipped with injection molding equipment for manufacturing components/containers would benefit from being able to use a blow molding grade HDPE resin, but the expense of adding blow molding equipment to the manufacturing assets may not be warranted. Moreover, until now, the ability to use injection molding equipment to mold parts with a blow molding grade resin has not been successful, principally because of the low melt index and slow flow characteristics of flow molding resins. It is to these ends that the present invention has been developed.

OVERVIEW OF THE INVENTION

The present invention is directed to a new and improved process for manufacturing molded plastic components, particularly livestock feed containers, formed of blow molding grade resins but using injection molding apparatus. In particular, the invention contemplates a process for manufacturing containers, such as agricultural/livestock feed containers, formed of HDPE blow molding grade resin, wherein the containers are molded using an injection molding apparatus and molding process.

In accordance with an important aspect of the invention, the plastic injection molding process of this invention enables a reduction in the amount of material required to manufacture certain types of containers, such as livestock feed tubs, using, for example, approximately 20% to 50% less material than previously required. In particular, containers comprising generally cylindrical or rectangular livestock feed tubs ranging in size from about 15.0 inches to 25.0 inches diameter or width, and by about 5.0 inches to 25.0 inches depth, can be manufactured by the process of the invention with a wall thickness in the range of about 0.070 to 0.150 inches. Moreover, typical HDPE molding temperatures may be maintained while injection or mold cavity pressures are raised to a range of about 20,000 psig to 27,000 psig to accomplish the molding, without premature solidification of the resin in the mold. Still further, blow molding grade HDPE resins having a density in the range of 0.958 to 0.965, and a melt index of 0.7 to 1.00 grams/10 min., have been used with the injection molding equipment. Molding temperatures may be raised to a range of 570° F. to 670° F., and injection pressures to a range of 2000 psig to 2300 psig, without suffering premature solidification or other product defects.

In accordance with a further aspect of the present invention, improved molded plastic containers formed of HDPE blow molding grade resin are provided and which have been molded by an injection molding process and equipment in accordance with the invention.

Those skilled in the art will further appreciate the above-mentioned advantages and superior features of the invention together with other important aspects thereof upon reading the detailed description which follows in conjunction with the drawings.

DETAILED DESCRIPTION

Figure 1:
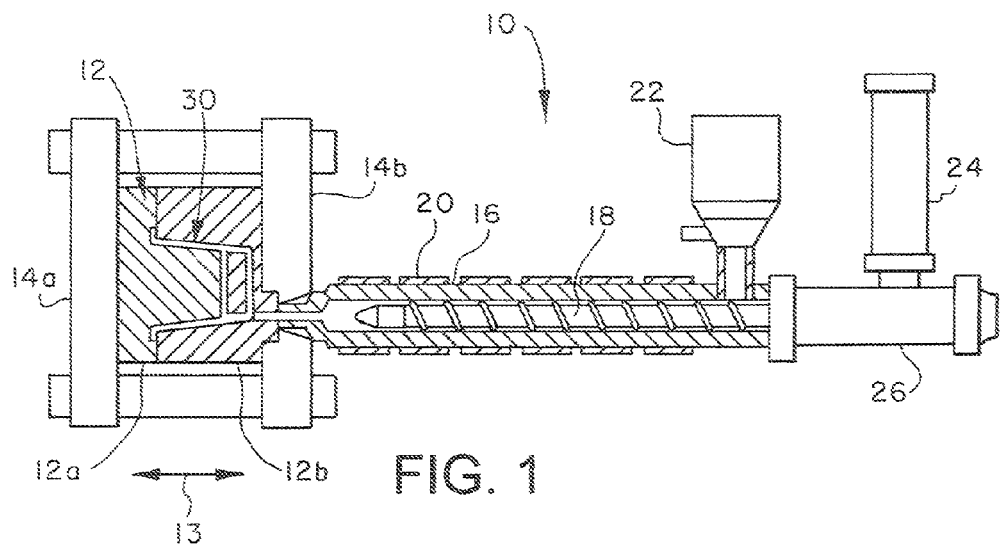
FIG. 1 is a schematic diagram of an injection molding apparatus used in connection with the molding process of the present invention.

In the description which follows, like elements are marked with the same reference numerals throughout the specification and drawing. The drawing figures are not necessarily to scale and certain elements are shown in schematic form in the interest of clarity and conciseness.

Referring to FIG. 1, there is illustrated a schematic diagram of major components of an injection molding apparatus or system, generally designated by the reference numeral 10. The injection molding apparatus or system 10 may be of a type commercially available, such as a 1125 ton injection molding machine available from Cincinnati Milacron, Cincinnati, Ohio. The schematic of FIG. 1 is intended to represent only major components of a typical injection molding system which may be utilized for carrying out the process of the present invention. Accordingly, the system 10 includes a two-part mold assembly 12, including opposed separable mold parts 12a and 12b disposed between clamping mechanism components 14a and 14b. The clamping components 14a and 14b may be moved toward and away from each other in the directions of arrow 13. An injection cylinder 16 is suitably connected to the mold assembly 12 and includes an injection screw 18 disposed therein. Suitable heater bands 20 are disposed around the exterior of the cylinder 16 for heating the plastic material to be injected into the mold 12. A feed hopper 22 is provided to hold the appropriate supply of polymer pellets which are then metered into the interior of the cylinder 16 where the pellets are heated to a fluid state for injection into the mold. An injection drive unit 26 is operably connected to the screw 18 and the cylinder 16 in a known manner, and an accumulator 24 is operatively coupled to the drive unit 26.

In accordance with the process of the present invention, containers are manufactured with injection molding apparatus like that of the system 10, but using pellets of HDPE resin with a material density in a range of about 0.958 to 0.965 g/cc, as distinguished from material of a density of about 0.900 to 0.955 g/cc, which is that typically associated with an injection molding grade of HDPE copolymer. Moreover, the high density polymer material has a melt index in the range of about 0.7 to 1.0 grams/10 min.

Figure 2:
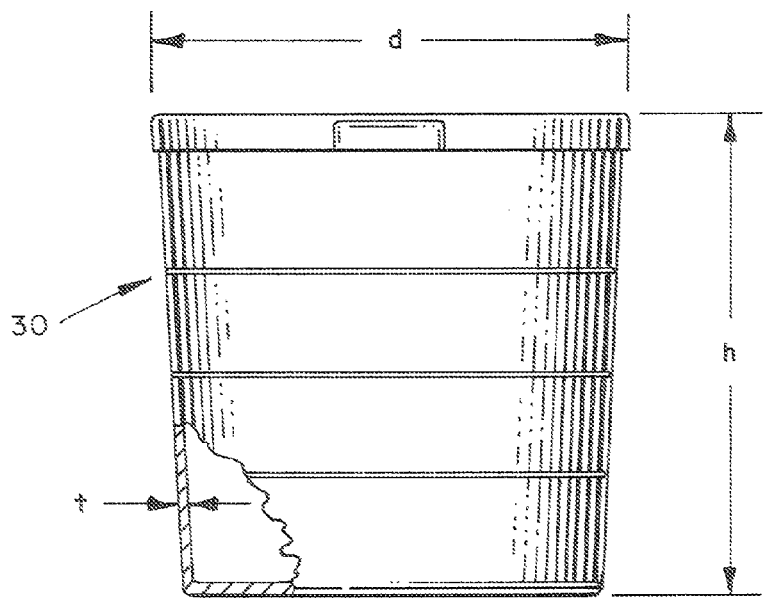
FIG. 2 is a side elevation, partially sectioned, of an injection molded container manufactured by the process of the present invention.

FIG. 2 illustrates a livestock feed container or tub 30 which was manufactured in accordance with the just described injection molding process and using the described high density material. The tub 30 is a substantially cylindrical container having a diameter "d", an overall height "h" and a wall thickness "t". More specifically, containers having a diameter "d" in the range of about 15.0 inches to 25.0 inches, an overall height "h" in the range of about 5.0 inches to 25.0 inches, and wall thickness "t" in the range of about 0.070 inches to 0.150 inches may be produced using the injection molding process of the present invention. Containers 30 within these dimensional ranges have been fabricated with the described high density HDPE resin having a melt index in the range of 0.7 to 1.0 g/10 min. This is compared with injection molding HDPE resins which typically have a melt index of about 6.0 to 7.0 g/10 min. It has also been determined that using the process of this invention, a savings in resin material of a about 20% to as much as 50% can be achieved.

Moreover, using the process of this invention for manufacturing containers 30 of the heretofore described dimensions, resin injection temperatures have been raised to about 570° F. to 670° F., with injection velocities in the range of about 3.8 to 4.0 in/sec., and fill pressures in the range of about 2000 to 2260 psi. Mold cavity pressures in the range of 20,000 psig to 27,000 psig were obtained.

Accordingly, contrary to conventional practice in which blow molding has been required for producing relatively thin walled cylindrical containers and the like, the present invention has successfully used injection molding processes for producing such products.

Although the process of this invention has been described in detail herein, those skilled in the art will recognize that various substitutions and modifications may be made without departing from the scope and spirit of the invention as defined solely by the appended claims.

What is claimed is:

1. A method of injection molding a thin walled container having a diameter or width in the range of about 15.0 inches to 25.0 inches, an overall height in the range of about 5.0 inches to 25.0 inches, and a wall thickness in the range of about 0.070 inches to 0.150 inches in an injection molding machine having a two-part mold defining said container, comprising:
   injecting into said mold a blow molding grade HDPE resin having a melt index in the range of about 0.7 to 1.0 g/10 min, wherein said HDPE resin is injected at a velocity in the range of 3.8 inches per second to 4.0 inches per second.

2. The method set forth in claim 1 wherein:
   the density of said HDPE resin is in the range of 0.958 to 0.965 g/cc.

3. The method set forth in claim 1 wherein:
   said HDPE resin is injected into said mold at a temperature in the range of about 570° F. to 670° F.

4. The method set forth in claim 1 wherein:
   said HDPE resin is injected into said mold at a pressure in the range of about 2000 psig to 2300 psig.

5. The method set forth in claim 1 wherein:
   said HDPE resin is injected at a cavity pressure of said mold in the range of 20,000 psig to 27,000 psig.

6. A method of injection molding a thin walled container having a diameter or width in the range of 15.0 inches to 25.0 inches, an overall height in the range of 5.0 inches to 25.0 inches, and a wall thickness in the range of 0.070 inches to 0.150 inches in an injection molding machine having a mold defining said container, the method comprising the steps of:
   injecting into said mold a blow molding grade HDPE resin having a melt index in the range of about 0.7 to 1.0 g/10 min., and a density in a range of about 0.958 to 0.965 g/cc; and
   injecting said resin into said mold at a temperature in a range of about 570° F. to 670° F., and a mold cavity pressure in a range of about 20,000 psig to 27,000 psig, wherein said resin is injected at a velocity in the range of 3.8 inches per second to 4.0 inches per second.

7. The method of claim 6, further comprising the step of:
   forming a molded container having a diameter or width in the range of 15.0 inches to 25.0 inches, an overall height in the range of 15.0 inches to 25.0 inches and a wall thickness in the range of 0.070 inches to 0.150 inches in said injection molding machine having a multi-part mold defining said container.

8. The method set forth in claim 7 wherein:
   said resin is injected into said mold at a temperature in the range of 570° F. to 670° F.

9. The method set forth in claim 6 wherein:
   said resin is injected into said mold at a pressure in the range of 2000 psig to 2300 psig.

10. The method set forth in claim 7 wherein:
    said resin is injected at a cavity pressure of said mold in the range of 20,000 psig to 27,000 psig.

* * * * *

UNITED STATES PATENT AND TRADEMARK OFFICE
CERTIFICATE OF CORRECTION

| | | |
|---|---|---|
| PATENT NO. | : 7,959,844 B1 | Page 1 of 1 |
| APPLICATION NO. | : 11/839722 | |
| DATED | : June 14, 2011 | |
| INVENTOR(S) | : Victor A. Sahm et al. | |

It is certified that error appears in the above-identified patent and that said Letters Patent is hereby corrected as shown below:

On the Title page, at (73), please delete the Assignee name "Maxi-Life, Inc." and replace with the correct Assignee name -- Maxi-Lift, Inc. --.

Signed and Sealed this
Second Day of August, 2011

David J. Kappos
*Director of the United States Patent and Trademark Office*